United States Patent [19]
Elmore et al.

[11] Patent Number: 5,133,837
[45] Date of Patent: Jul. 28, 1992

[54] DIMPLED PLATE MULTI-STAGE FLASH EVAPORATOR

[75] Inventors: Carl L. Elmore; Kyle D. Infante, both of Glens Falls, N.Y.

[73] Assignee: Kamyr, Inc., Glens Falls, N.Y.

[21] Appl. No.: 579,535

[22] Filed: Sep. 10, 1990

[51] Int. Cl.$^5$ .............................................. B01D 3/06
[52] U.S. Cl. ................................. 202/173; 202/177; 202/185.1; 202/197; 202/205; 202/267.1; 165/166; 203/7; 203/11; 203/86; 203/DIG. 14; 203/DIG. 17
[58] Field of Search ............. 203/10, 11, 40, DIG. 14, 203/DIG. 17, 99, 7, 86; 202/173, 185.1, 197, 176, 267.1, 205; 165/166, 167; 159/DIG. 8, DIG. 31, 28.6

[56] References Cited

U.S. PATENT DOCUMENTS

| 1,020,480 | 3/1912 | Cumberband | 204/196 |
| 2,908,618 | 10/1959 | Bethon | 202/174 |
| 3,197,387 | 7/1965 | Lawrance | 202/173 |
| 3,211,219 | 10/1965 | Rosenblad | 165/165 |
| 3,398,059 | 8/1968 | Cane et al. | 202/173 |
| 3,476,654 | 11/1969 | Sieder | 202/173 |
| 3,493,040 | 2/1970 | Davidson | 159/28.6 |
| 3,512,239 | 5/1970 | Rosenblad | 29/157.3 |
| 3,632,481 | 1/1972 | Hammond | 202/173 |
| 3,808,104 | 4/1974 | Davidson | 202/173 |
| 3,930,958 | 1/1976 | Maruichi | 202/173 |
| 4,510,030 | 4/1985 | Miyashita et al. | 204/147 |
| 4,636,283 | 1/1987 | Nasser | 202/173 |

FOREIGN PATENT DOCUMENTS

| 55-25782 | 2/1980 | Japan | 202/173 |
| 1034466 | 6/1966 | United Kingdom . | |
| 1290050 | 9/1972 | United Kingdom . | |
| 2195908 | 4/1988 | United Kingdom . | |

OTHER PUBLICATIONS

Awerbuch et al., "Desalination Technology Report on the State of the Art", Bechtel Group, Inc.
The U.S.A.I.D. Desalination Manual, Chapter 3, "Distillation", 1980.

Primary Examiner—Wilbur Bascomb, Jr.
Attorney, Agent, or Firm—Nixon & Vanderhye

[57] ABSTRACT

A multi-stage flash evaporator is constructed so that the evaporator elements are dimpled plates mounted so that they extend horizontally. One, two, or more sets of plates may be mounted in each evaporator stage, the sets stacked upon one another in a tier arrangement. Each stage may be formed by a circular cross-section vessel, with I-beams—or like supports—extending horizontally at about the horizontal diameter of the vessel, and supporting the dimpled plates on them. A condensate collection trough is mounted below the dimpled plates and at the I-beams, the I-beams having openings in them through which condensate collected by the trough passes from one end of the vessel to the other. The hot liquid—such as sea water to be desalinated—to be evaporated is passed into a bottom chamber of each stage vessel, with vapor flowing upwardly through demistors and channels, into contact with the dimpled plates, and the condensate falling as a thin film down the plates and collecting in the condensate trough. The brine is preheated by passing it into the passageways within the dimpled plates counter to the direction of flow of the brine into and through the bottom chambers. The plates are preferably titanium or aluminum, but may be stainless steel if brackish water is distilled. A sacrificial anode may be mounted adjacent the plates.

23 Claims, 3 Drawing Sheets

DIMPLED PLATE MULTI-STAGE FLASH EVAPORATOR

BACKGROUND AND SUMMARY OF THE INVENTION

The invention relates to an evaporator and individual evaporator effects that are particularly advantageous for a number of processes. The invention is particularly—although not exclusively—applicable, however, to the desalination of water.

Multi-stage flash evaporators are well known, per se, for the desalinization (distillation) of water, and have been commercially used for that purpose since the 1950s. Conventional multi-stage flash evaporators use a series of interconnected effects each having horizontally extending tubes through which water to be distilled flows until it is led to a heater. From the heater the water to be distilled is passed back into the stages, countercurrent to the original direction of flow, and flashes, the vapor passing through a demistor and then into contact with the relatively cool tubes, forming condensate which is collected below the tubes. The tubes may be provided either in a cross tube configuration with a water box interconnecting the tubes and transporting the liquid within them between each stage, or they may be constructed in a long-tube configuration, where the tubes extend between each stage in a direction parallel to the flow of a liquid being flashed through the stages (counter thereto).

While conventional multi-stage flash evaporators are effective, they do not have efficiencies as great as desired.

According to the present invention, a multi-stage flash evaporator—and the individual effects therefor—are provided which can have a number of advantages compared to conventional multi-stage flash evaporator systems. According to the present invention, instead of tubes, horizontally extending, elongated dimpled plate evaporator elements are utilized. The dimpled plates are disposed in one or more sets, one stacked above the other in a tier arrangement. The dimpled plate horizontal element construction has a uniform liquor distribution, high heat transfer coefficients, and other potential advantages. The dimpled plates preferably have a construction such as shown in U.S. Pat. Nos. 3,211,219 and 3,512,239, the disclosures of which are hereby incorporated by reference herein.

According to one aspect of the present invention, an evaporator effect for a multi-stage flash evaporator is provided. The evaporator effect comprises: A horizontally elongated vessel having a top, bottom, first end, and second end. A first set of elongated in a dimension of elongation dimpled plate evaporator elements, each defining an interior passage, and having an exterior surface. Means for mounting the first set of dimpled plate evaporator elements so that they are disposed in the vessel with their dimension of elongation horizontal, and so that there are spaces between the exterior surfaces of the dimpled plate evaporator elements within the set, and so that the evaporator elements are above the bottom of the vessel, but below the top thereof. Means defining a chamber for hot liquid to be evaporated in the bottom of the vessel, below the evaporator elements. Means defining at least one channel for vapor from the hot liquid in the bottom chamber to pass upwardly into contact with the exterior surfaces of the evaporator elements. Demisting means operatively associated with the channel; and, condensate collection means disposed above the bottom chamber but below the elements, for receipt of condensate formed by vapor condensing on the dimpled plate evaporator elements, and for transporting the condensate liquid out of the vessel. The means for mounting the evaporator elements may comprise a plurality of supports—such as I-beams—which extend horizontally substantially transverse to the dimension of elongation of the plates, and mounted at the approximate mid point of the vessel (e.g. the horizontal diameter if it is circular in cross-section). The supports have openings therein through which condensate collected by the condensate collecting means can flow, the condensate collecting means at approximately the same level as the supports. Of course second, third, and even more sets of dimpled plate evaporator elements may be provided, constructed in a tier arrangement.

It is desirable to preheat the liquid to be evaporated by passing it into the interior passage of each effect, being introduced at a bottom portion into the passage of the effect elements at the second end of the vessel, and being withdrawn from the first end of the vessel at a top portion of the effect elements. The liquid to be evaporated, on the other hand, after heating thereof, passes into the bottom chamber at the first end of the vessel, and passes out of the bottom chamber at the second end of the vessel.

The dimpled plates used in the effect elements preferably are made of titanium or aluminum where the evaporator is used for the desalination (distillation) of sea water, but the plates may be stainless steel if brackish water is distilled. A sacrificial anode—such as a zinc anode—may be mounted adjacent the plates to extend their longevity.

Also according to the present invention, a multi-stage flash evaporator is provided which comprises a plurality of the effects described above interconnected with each other. A liquid heater is provided adjacent the first stage, and passes heated liquid into the bottom chamber of the first stage. The heated liquid then flows into—being flashed in each case—each of the subsequent stage bottom chambers, the pressure slightly decreasing from the first stage to the last stage. This pressure decrease may be provided by connecting the last stage to a partial vacuum, such as a steam ejector. The condensate flows from one stage to the next parallel to the evaporating liquid flow, while the liquid to be evaporated—before it is heated—flows countercurrently to these flows through the passages in the dimpled plate evaporator effects to be preheated prior to its introduction into the heater. The evaporator can either be a once-through multi-stage distillation facility, or a recycle distillation facility.

It is the primary object of the present invention to provide an effective multi-stage flash evaporator, and individual evaporator effects thereof. This and other objects of the invention will become clear from an inspection of the detailed description of the invention, and from the appended claims.

DETAILED DESCRIPTION OF THE DRAWINGS

Figure 1:
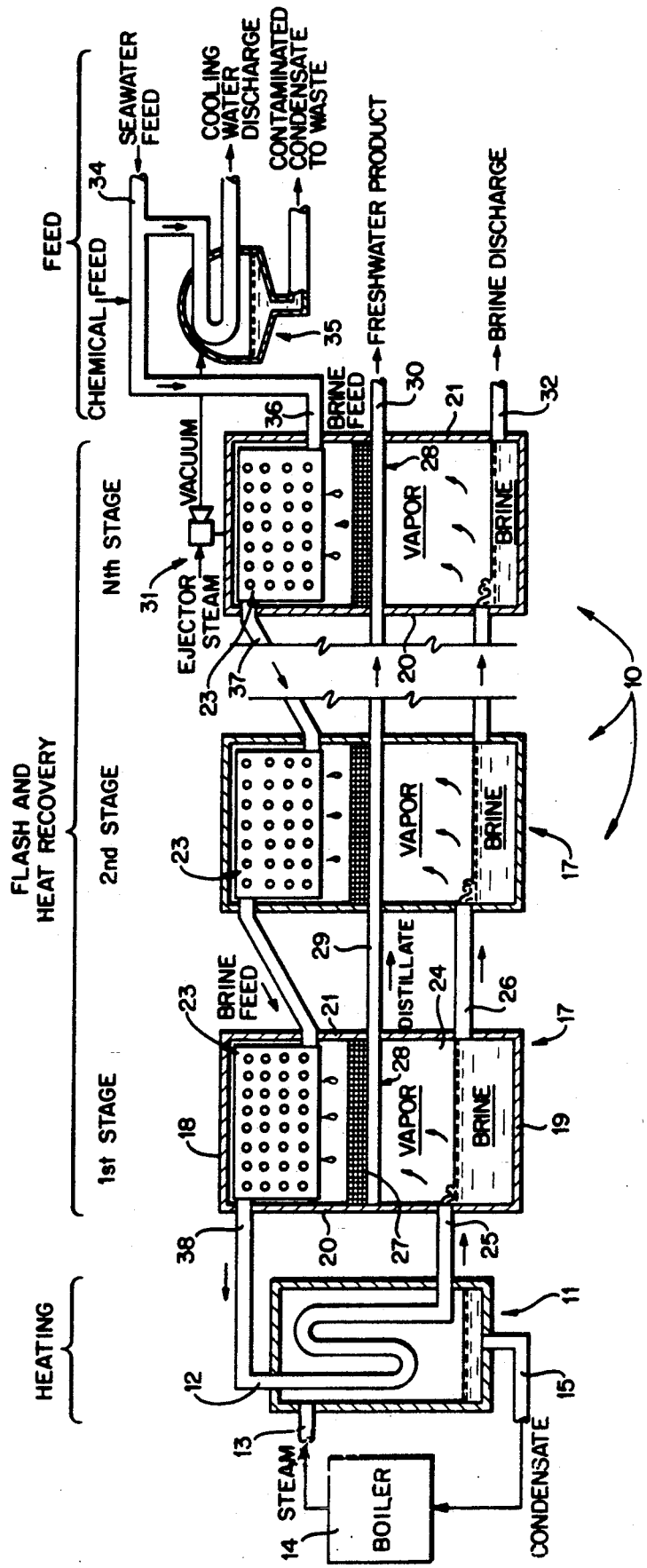
FIG. 1 is a schematic view of a once-through multi-stage flash evaporator according to the present invention.

FIG. 1 schematically illustrates a multi-stage flash evaporator according to the present invention at 10, showing first, second, and nth stages. Any number of stages can be provided. The evaporator as illustrated in FIG. 1 can be made essentially identical to conventional multi-stage flash evaporators except for the details of each of the individual effects (stages). The evaporator 10 of FIG. 1 will be described with respect to the desalination (distillation) of sea water, but it is to be understood that the evaporator can also be used for other purposes.

A brine heater for heating the sea water to be evaporated is shown schematically at 11 in FIG. 1. Sea water in conduit 12 is fed into the heater 11 to flow in a closed path, and steam is provided to the open interior volume—surrounding the conduit 12—within the heater 11 through conduit 13 from boiler 14. The heat from the steam is transferred to the sea water in the conduit 12, and the steam condenses, being withdrawn from the bottom of the heater 11 through condensate conduit 15, and recycled to the boiler 14.

From the heater 11, the heated sea water passes first to the first stage, and then to the subsequent stages of the flash and heat recovery section of the evaporator 10. Each stage—for example the first stage—comprises a vessel 17 having a top 18, bottom 19, first end 20, second end 21, and sides. A first set of elongated in a dimension of elongation dimpled plate evaporator elements, shown schematically at 23 in FIG. 1—are provided in each stage, the elements each defining an interior passage defined between a pair of plates of that element, and a plurality of elements defined by pairs of plates being provided in the first set. The elements 23 are mounted within each vessel 17 so that they are disposed with their dimension of elongation horizontal.

Each vessel 17 also comprises means defining a bottom chamber 24 for receipt of the hot liquid to be evaporated, from heater 11. An inlet conduit 25 is provided at the first end of the vessel 11, and the hot liquid flashes when it enters the chamber 24, vapor being generated and flowing upwardly. The majority of the fluid introduced remains liquid, however, and passes through an outflow conduit 26 to the next stage/vessel 17.

The vapor that forms in chamber 24 passes through one or more channels—each having a demistor 27 therein—into the top portion of the vessel 17 to contact the elements 23 therein. The elements 23 are colder than the vapor, so that the vapor condenses on the dimpled plates and falls in a film down the plates to a condensate collecting means—shown generally by reference numeral 28 in FIG. 1. This condensate/distillate flows from the first stage through conduit 29 to the second, and subsequent stages, parallel to the flow of the brine being evaporated. Ultimately the fresh water product/distillate produced is withdrawn from conduit 30 of the last (nth) stage.

The pressure in each of the stages from the first to the last stage decreases. This continuous pressure decrease may be provided by applying a partial vacuum to the nth stage, as by using a conventional steam ejector 31.

The evaporator 10 illustrated in FIG. 1 is a once-through multi-stage flash evaporator. That is the brine is discharged at 32 from the nth stage, rather than recycled.

It is desirable to preheat the sea water to be evaporated before it is fed to the brine heater 11. This is preferably accomplished according to the invention by passing the sea water through each of the effects in vessel 17 counter to the flow of distillate and flashing brine therethrough. Sea water is initially introduced into feed conduit 34, and a portion thereof is passed through ejector-condenser 35, while the majority passes into the inlet 36 at the bottom of the dimpled plate evaporator elements 23 in the last effect. The sea water passes through the passages between the dimpled plates forming each element of the first set 23 of elements, and is heated by the vapor giving up its heat of condensation in the last effect. The sea water is then withdrawn from the elements 23 at 37 from the tops of the elements adjacent the first end 20 of the last effect, and then is passed to the bottoms of the elements 23 of the next effect at the second end 21 thereof. This procedure establishes a counterflow (with respect to the flow of distillate and flashing brine) of the sea water as it is being preheated. Ultimately, the preheated sea water is withdrawn from conduit 38 at the top of the second end 20 of the first effect, and this is connected to the conduit 12 passing through the brine heater 11.

As is conventional, preferably a chemical feed is provided to the sea water in conduit 34 as illustrated on the right hand side of FIG. 1. The chemical feed may include polyphosphate, up to 190° F., or polyelectrolyte up to 250° F. Other conventional materials may also be utilized.

Figure 2:
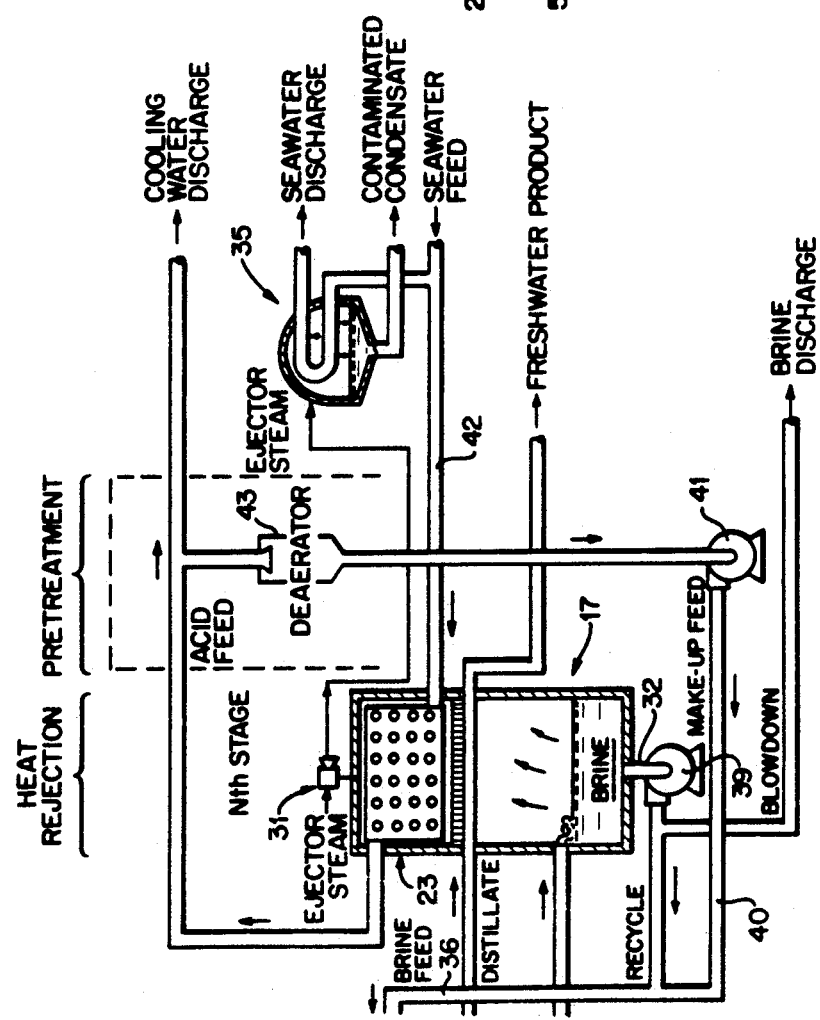
FIG. 2 is a modification—of the last stage of the evaporator of FIG. 1 showing recycle of the brine.

FIG. 2 shows the feed section of an evaporator like that of FIG. 1 for a recycle plant, rather than a once-through plant. In this embodiment, the brine withdrawn through conduit 32 of the last stage is pumped by recycle pump 39 and the majority is combined with fresh sea water in conduit 40 pumped by make-up feed pump 41, and is fed as the brine feed 36 to the second to last stage. The sea water pumped by the pump 41 has been slightly preheated by passing it in conduit 42 to the evaporator elements 23 in the top of the last stage, and preferably it passes through a deaerator 43 before being fed to the pump 41.

Figure 4:
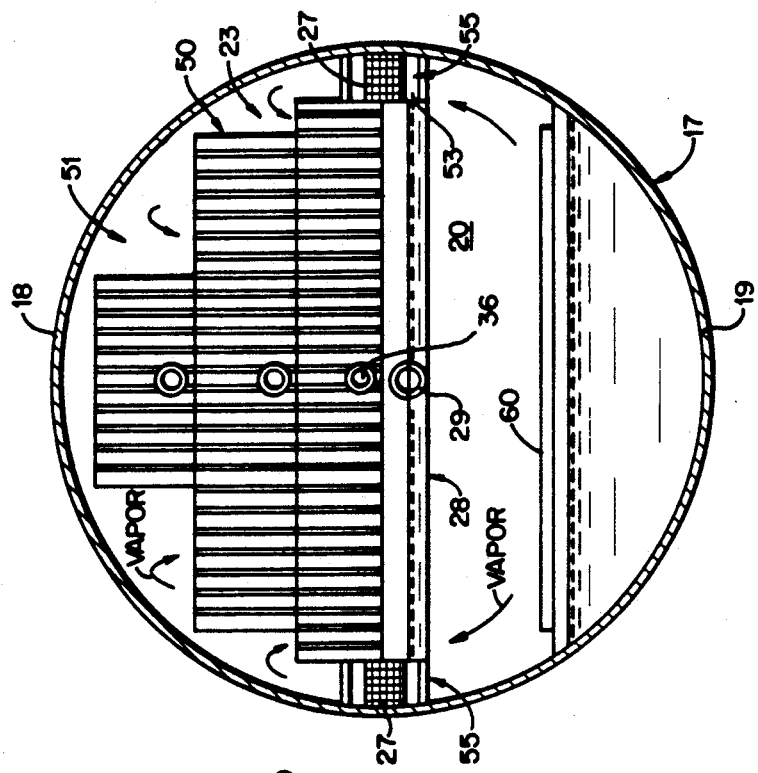
FIG. 4 is an end view—looking in at the end of the vessel through which the condensate is withdrawn with the vessel end wall removed—of the apparatus of FIG. 3
Figure 3:
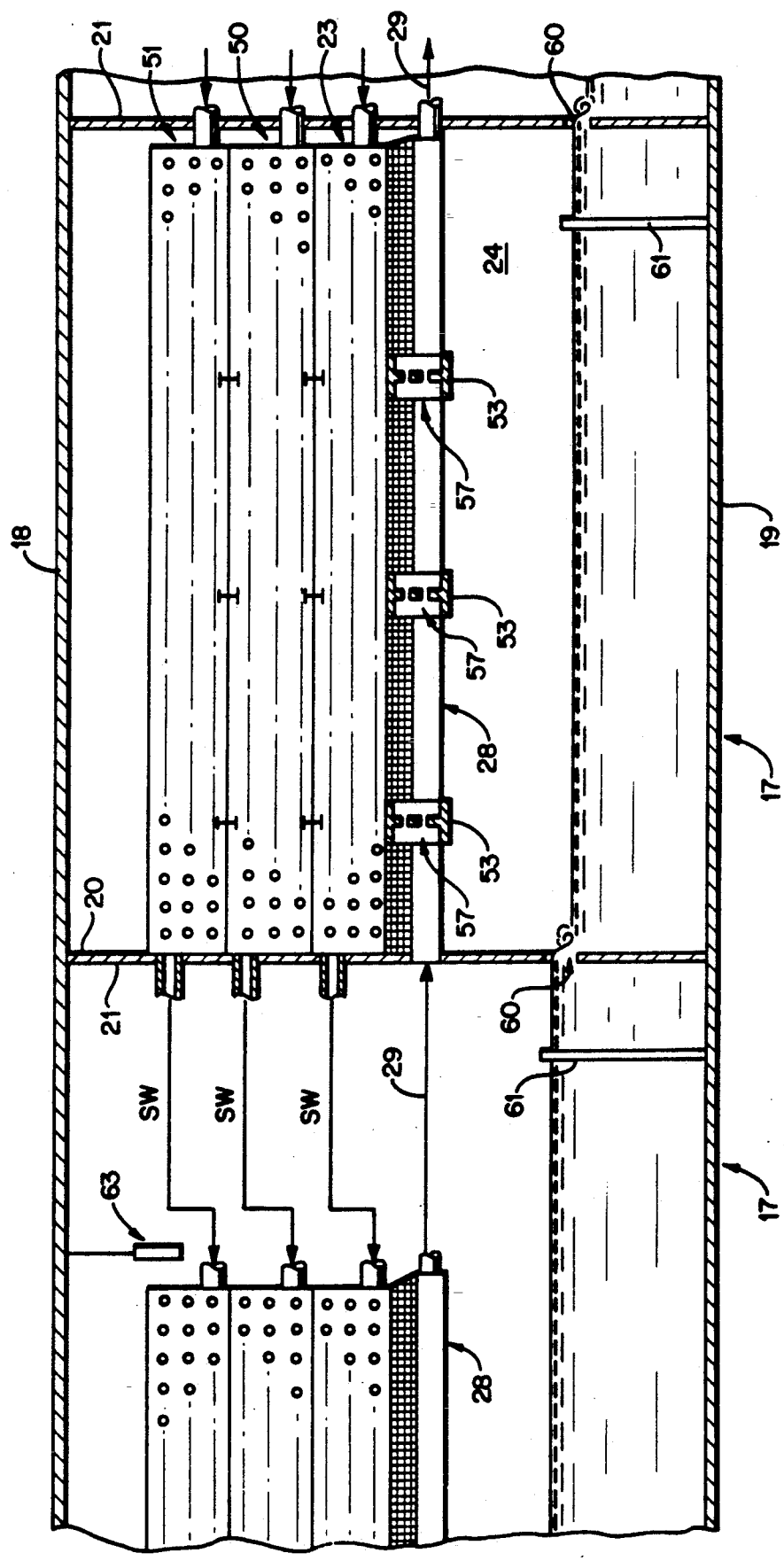
FIG. 3 is a side schematic cross-sectional view of portions of two of the effects of the evaporator of FIG. 1.

A more detailed showing of each effect of the evaporator 10, according to the invention, is provided in FIGS. 3 and 4. Note—as illustrated in FIGS. 3 and 4—that it is desirable to provide a plurality of sets of effects rather than merely one set. In addition to the first set 23, in FIGS. 3 and 4 a second set 50, and a third set 51 of dimpled plate evaporator elements are provided. Note—as illustrated most clearly in FIG. 4—these sets are provided stacked one upon another in a tier arrangement. While a tiered affect is not necessary if the vessel 17 has a quadrate cross-section, most desirably the vessel 17 will have a circular cross-section, in which case the tiered mounting is desirable.

The dimpled plates forming each of the sets 23, 50, 51 are illustrated and described in U.S. Pat. Nos. 3,211,219 and 3,512,239, the disclosures of which have been incorporated by reference herein. The individual elements of the sets 23, 50, 51 are spaced from each other horizontally in the dimension transverse to the dimension of elongation thereof, so that the exterior surface of each of the plates may be contacted by vapor of the flashing brine from the bottom chamber 24 of the vessel 17.

The means for mounting the elements of the sets 23, 50, 51 within the vessel 17 preferably comprise a plurality of supports extending horizontally substantially transverse to the dimension of elongation of the elements 23, etc., such supports being illustrated in the form of I-beams 53 in FIGS. 3 and 4. Preferably the I-beams 53 are provided at about the horizontal diameter of the vessel 17 when it is circular in cross-section.

Means that are provided defining the channels for vapor to pass from the bottom chamber 24 up into contact with the elements of the sets 23, etc., include the I-beams 53 and the side terminations of both the condensate collecting means 28 and the elements of the first set 23. A conventional demistor 27 is provided in each of the channels, the channels being shown schematically by reference arrows and characters 55 in FIG. 4.

The condensate collecting means 28 preferably comprises a trough, as illustrated in FIGS. 3 and 4. In FIG. 3 the trough is cut away at each of the I-beams 53 to illustrate means defining openings 57 in the I-beams that allow the condensate to flow from an entrance conduit 29 at the first end 20 of the vessel 17, to a like, exit, conduit 29 at the second end 21 of the vessel 17. Condensate which flows as a thin film down dimpled plate evaporator elements of the sets 23, etc., falls by gravity directly into the open top of the trough 28, and then flows toward the second end 21 of the vessel 17 as illustrated.

A wide variety of conventional arrangements can be utilized to introduce the brine to be flashed from one vessel 17 stage to the next. In the exemplary embodiment illustrated in FIGS. 3 and 4, instead of there being distinct conduits—such as the conduit 26 schematically illustrated in FIG. 1—between effects, since a common wall provides the first end of one effect and the second end of the previous effect, all that need be provided is an elongated slit 60 cut in each of the end walls 20, 21 of each vessel 17. A weir 61 preferably is provided in the bottom chamber 24 closer to the second end 21 of each vessel 17 than the first end 20 thereof. The heights of the slits 60 and weirs 61 are gauged to take into account the decreasing volume of the brine as it flows from the first stage to the last, since obviously a portion of the brine will vaporize in each stage, thereby decreasing the liquid volume.

When the evaporator 10 and the effects thereof are used for distillation of fresh water from sea water, it is desirable to construct the dimpled plates out of titanium or aluminum, titanium being preferred. However if the distillate is to be produced from brackish water instead, the plates forming of the dimpled plate evaporator elements may be made of stainless steel instead. In some circumstances, it may be desirable to provide a sacrificial anode in one or more of the effects. A sacrificial zinc anode—grounded to the vessel 17—is very schematically illustrated at 63 in FIG. 3, the positioning of the anode 63 being such that if any current is set up the sacrificial anode 63 will be consumed rather than the dimpled plates.

It will thus be seen that according to the present invention individual evaporator effects, and an evaporator, have been provided which have high heat transfer coefficients and uniform liquor distribution. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An evaporator effect for a multi-stage flash evaporator, comprising:
    a circular cross-section horizontally elongated vessel having a top, bottom, first end, and second end;
    a first set of dimpled plate evaporator elements elongated in a dimension of elongation, each defining an interior passage, and having an exterior surface;
    means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof;
    a second set of elongated dimpled plate evaporator elements, said second set of elements having fewer elements than said first set and disposed on top of said first set of elements, forming a stepped tier arrangement therewith;
    means defining a bottom chamber for hot liquid to be evaporated adjacent the bottom of the vessel, below the evaporator elements;
    means defining at least one channel for vapor from the hot liquid in the bottom chamber to pass upwardly into contact with the exterior surfaces of the evaporator elements;
    demisting means operatively associated with said channel; and
    condensate collection means disposed above said bottom chamber but below said elements, for receipt of condensate formed by vapor condensing on said dimpled plate evaporator elements, and for transporting the condensate liquid out of said vessel.

2. An evaporator effect as recited in claim 1 wherein said vessel is circular in cross-section.

3. An evaporator effect as recited in claim 1 further comprising a hot liquid input at a first end of said bottom chamber, and a hot liquid output from the second end of said vessel bottom chamber, and a weir disposed in said vessel bottom chamber closer to said second end than said first end.

4. An evaporator effect as recited in claim 1 further comprising a third set of dimpled plate evaporator elements, said third set mounted on said second set in a stepped tier arrangement.

5. An evaporator effect as recited in claim 1 wherein said dimpled plates are made of a material selected from the group consisting essentially of titanium and aluminum.

6. An evaporator effect as recited in claim 5 further comprising a sacrificial anode mounted adjacent said plates.

7. An evaporator effect for a multi-stage flash evaporator, comprising:
    a horizontally elongated vessel having a top, bottom, first end, and second end;
    a first set of dimpled plate evaporator elements elongated in a dimension of elongation, each defining an interior passage, and having an exterior surface;

means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof;

means defining a bottom chamber for hot liquid to be evaporated adjacent the bottom of the vessel, below the evaporator elements;

means defining at least one channel for vapor from the hot liquid in the bottom chamber to pass upwardly into contact with the exterior surfaces of the evaporator elements;

demisting means operatively associated with said channel;

condensate collection means disposed above said bottom chamber but below said elements, for receipt of condensate formed by vapor condensing on said dimpled plate evaporator elements, and for transporting the condensate liquid out of said vessel; and wherein said mean for mounting said first set of dimpled plate evaporator elements comprises a plurality of support elements comprises a plurality of support elements extending horizontally and substantially traverse to said dimension of elongation of said dimpled plate evaporator elements, and wherein said support elements comprise means defining openings therein for allowing the passage of condensate therethrough, said supports at least partially contained within said condensate collection means.

8. An evaporator effect as recited in claim 7 wherein said means defining at least one channel comprises means defining a channel on both sides of said first set of evaporator elements, and a demisting means associated with each channel.

9. An evaporator effect for a multi-stage flash evaporator, comprising:
a circular in cross-section horizontally elongated vessel having a top, bottom, first end, and second end;

a first set of dimpled plate evaporator elements elongated in a dimension of elongation, each defining an interior passage, and having an exterior surface;

means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof;

means defining a bottom chamber for hot liquid to be evaporated adjacent the bottom of the vessel, below the evaporator elements;

means defining at least one channel for vapor from the hot liquid in the bottom chamber to pass upwardly into contact with the exterior surfaces of the evaporator elements;

demisting means operatively associated with said channel;

condensate collection means disposed above said bottom chamber but below said elements, for receipt of condensate formed by vapor condensing on said dimpled plate evaporator elements, and for transporting the condensate liquid out of said vessel; and wherein said means for mounting said first set of dimpled plate evaporator elements comprises a plurality of support elements disposed at substantially the horizontal diameter of said vessel.

10. An evaporator effect as recited in claim 9 further comprising a second set of elongated dimpled plate evaporate elements, said second set of elements being disposed on top of said first set of elements, forming a tier arrangement therewith.

11. An evaporator effect for a multi-stage flash evaporator, comprising:
a horizontally elongated vessel having a top, bottom, first end, and second end;

a first set of dimpled plate evaporator elements elongated in a dimension of elongation, each defining an interior passage, and having an exterior surface;

means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof;

means defining a bottom chamber for hot liquid to be evaporated adjacent the bottom of the vessel, below the evaporator elements;

means defining at least one channel for vapor from the hot liquid in the bottom chamber to pass upwardly into contact with the exterior surfaces of the evaporator elements;

demisting means operatively associated with said channel;

condensate collection means disposed above said bottom chamber but below said elements, for receipt of condensate formed by vapor condensing on said dimpled plate evaporator elements, and for transporting the condensate liquid out of said vessel; and means for introducing cooler liquid than in said bottom chamber into the interior of said dimpled plate evaporator elements at said second end of said vessel at a bottom portion of said elements, and means for withdrawing said liquid from said first ends of said vessel at a top portion of said evaporator elements.

12. An evaporator effect as recited in claim 11 further comprising a hot liquid input at a first end of said bottom chamber, and a hot liquid output from the second end of said vessel bottom chamber.

13. An evaporator effect as recited in claim 12 wherein said vessel is circular in cross-section, and wherein said evaporator elements mounting means are provided at approximately the horizontal diameter of said vessel.

14. An evaporator effect as recited in claim 12 wherein said means for mounting said first set of dimpled plate evaporator elements comprises a plurality of support elements extending horizontally and substantially traverse to said dimension of elongation of said dimpled plate evaporator elements.

15. An evaporator effect as recited in claim 14 wherein said support elements comprise means defining openings therein for allowing the passage of condensate therethrough, said support elements at least partially contained within said condensate collection means.

16. A multi-stage flash evaporator for evaporating a first liquid, comprising:
- a heating apparatus for heating said first liquid to a high temperature;
- a plurality of evaporator effects mounted in series and including at least first, second, and last effects;
- each effect comprising a horizontally elongated vessel having a top, bottom, first end, second end, first side, and second side;
- each effect also further comprising: a first set of elongated in a dimension of elongation dimpled plate evaporator elements, each defining an interior passage, and having an exterior surface; means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof; means defining a bottom chamber for hot liquid to be evaporated adjacent the bottom of the vessel, below the evaporator elements; means defining at least one channel for vapor from the hot liquid in the bottom chamber to pass upwardly into contact with the exterior surfaces of the evaporator elements; demisting means operatively associated with said channel; and condensate collection means disposed above said bottom chamber but below said elements, for receipt of condensate formed by vapor condensing on said dimpled plate evaporator elements, and for transporting the condensate liquid out of said vessel;
- said bottom chamber of said first effect connected at said first end thereof to said heating means, and connected at said second end thereof to said second effect bottom chamber, with connection means between the bottom chambers of each subsequent effect, in sequence;
- condensate transporting means for transporting condensate from said condensate collecting means of the first effect at the second end thereof to the condensate collecting means of the second effect at the first end thereof, with subsequent connections between the condensate collecting means of the rest of the effects, in sequence;
- means for drawing a partial vacuum in said last effect in the volume within which said evaporator effect elements are disposed;
- means for feeding said first liquid into the interior passages of said dimpled plate evaporator elements of said last effect at a bottom portion thereof, at said second end of said last effect, and passing the liquid from a top portion of said elements passages at the first end of said last effect; means for interconnecting said top portion of said evaporator elements from said first end of said last effect to said second end of the next effect, with subsequent connections between the evaporator element passages of all of the effects; and
- means for transporting the first liquid from the passage in the evaporator elements of said first effect into said heating means.

17. An evaporator as recited in claim 16 further comprising: means for drawing a partial vacuum in said last effect in the volume within which said evaporator effect elements are disposed.

18. A multi-stage flash evaporator as recited in claim 16 wherein said dimpled plates are made of a material selected from the group consisting essentially of titanium and aluminum.

19. A multi-stage flash evaporator as recited in claim 16 further comprising a sacrificial anode mounted adjacent said plates.

20. A multi-stage flash evaporator as recited in claim 16 further comprising a second set of elongated dimpled plate evaporator elements, said second set of elements being disposed on top of said first set of elements, forming a tier arrangement therewith.

21. A multi-stage flash evaporator for evaporating a first liquid, comprising:
- a heating apparatus for heating said first liquid to a high temperature;
- a plurality of evaporator effects mounted in series and including at least first, second, and last effects;
- each effect comprising a horizontally elongated vessel having a top, bottom, first end, second end, first side, and second side;
- each effect also further comprising: a first set of elongated in a dimension of elongation dimpled plate evaporator elements, each defining an interior passage, and having an exterior surface; means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof; means defining a bottom chamber for hot liquid to be evaporated adjacent the bottom of the vessel, below the evaporator elements; means defining at least one channel for vapor from the hot liquid in the bottom chamber to pass upwardly into contact with the exterior surfaces of the evaporator elements; demisting means operatively associated with said channel; and condensate collection means disposed above said bottom chamber but below said elements, for receipt of condensate formed by vapor condensing on said dimpled plate evaporator elements, and for transporting the condensate liquid out of said vessel;
- said bottom chamber of said first effect connected at said first end thereof to said heating means, and connected at said second end thereof to said second effect bottom chamber, with connection means between the bottom chambers of each subsequent effect, in sequence;
- condensate transporting means for transporting condensate from said condensate collecting means of the first effect at the second end thereof to the condensate collecting means of the second effect at the first end thereof, with subsequent connections between the condensate collecting means of the rest of the effects, in sequence; and
- wherein said means for mounting said first set of dimpled plate evaporator elements comprises a plurality of support elements extending horizontally and substantially traverse to said dimension of elongation of said dimpled plate evaporator elements, said support elements comprising means defining openings therein for allowing the passage of condensate therethrough, said supports at least partially contained within said condensate collection means.

22. A multi-stage flash evaporator as recited in claim 21 wherein said vessel is circular in cross-section, and wherein said support elements are provided at approximately the horizontal diameter of said vessel.

23. An evaporator effect for a multi-stage flash evaporator, comprising:

a horizontally elongated vessel having a top, bottom, first end, and second end;

a first set of dimpled plate evaporator elements elongated in a dimension of elongation, each defining an interior passage, and having an exterior surface, and are made from a material selected from the group consisting essentially of titanium and aluminum;

means for mounting said first set of dimpled plate evaporator elements so that they are disposed in said vessel with their dimension of elongation horizontal, and so that there are spaces between the exterior surfaces of the dimpled plate evaporator elements within the set, and so that said evaporator elements are above the bottom of the vessel, but below the top thereof;

means defining a bottom chamber for hot liquid to be evaporated adjacent the bottom of the vessel, below the evaporator elements;

means defining at least one channel for vapor from the hot liquid in the bottom chamber to pass upwardly into contact with the exterior surfaces of the evaporator elements;

demisting means operatively associated with said channel;

condensate collection means disposed above said bottom chamber but below said elements, for receipt of condensate formed by vapor condensing on said dimpled plate evaporator elements, and for transporting the condensate liquid out of said vessel; and a second set of elongated dimpled plate evaporator elements, said second set of elements being disposed on top of said first set of elements, forming a stepped tier arrangement therewith.

* * * * *